United States Patent
Stanley et al.

[15] 3,666,746
[45] May 30, 1972

[54] PYRROLIDONYLPHENYL AZO DYESTUFFS

[72] Inventors: Lester N. Stanley, Delmar; Russell E. Farris, Jr., Elnora, both of N.Y.

[73] Assignee: GAF Corporation, New York, N.Y.

[22] Filed: June 25, 1969

[21] Appl. No.: 836,602

[52] U.S. Cl............................260/152, 260/141, 260/142, 260/155, 260/162, 260/239.3 A, 260/247.7 J, 260/251 R, 260/281, 260/289 R, 260/293.87, 260/306.7, 260/307 A, 260/309.7, 260/310 A, 260/310 D, 260/326 R, 260/326 S, 260/326 NS, 260/326 HL, 260/326.5 B, 260/326.5 FL, 260/340.2
[51] Int. Cl.................C09b 29/08, C09b 29/10, C09b 29/38
[58] Field of Search.................260/141, 142, 152, 162, 155, 260/156

[56] References Cited

UNITED STATES PATENTS

| | | | |
|---|---|---|---|
| 2,804,455 | 8/1957 | Dorlars et al. | 260/152 X |
| 2,873,267 | 2/1959 | Steinemann | 260/152 X |
| 3,117,961 | 1/1964 | Lange et al. | 260/152 X |
| 3,234,208 | 2/1966 | Liechti | 260/152 X |
| 3,342,799 | 8/1967 | Wallace et al. | 260/152 |
| 3,445,452 | 5/1969 | Weaver et al. | 260/152 |

*Primary Examiner*—Floyd D. Higel
*Attorney*—S. B. Leavitt

[57] ABSTRACT

Dyes for dyeing hydrophobic fibers such as acrylics and polyesters of the formula:

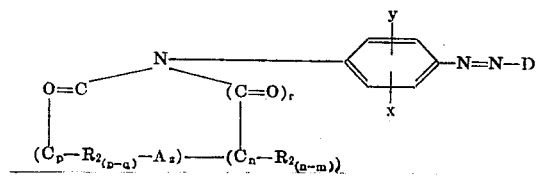

and quaternized derivatives thereof wherein $R$'s are independently selected from hydrogen, halogen, hydroxy, alkyl, substituted alkyl, aryl, substituted aryl, cycloalkyl and the like;

$A$ is $O$, $N$ or $S$;

$n$ and $p$ are integers from 0 to 15 $n+p$ is at least 2;

$z$ is an integer of 0 or 1;

$r$ is an integer of 0 or 1;

$n+p+z+r$ is at least 3;

$m$ and $q$ are the number of double bonds in the $C_n$ and $C_p$ moities;

$x$ and $y$ are selected from hydrogen, halogen, lower alkyl, lower alkoxy, sulfonic acid amide and substituted derivatives thereof, carboxylic acid amides and substituted derivatives thereof, lower alkylsulfonyl, cyano, carbalkoxy, nitro, and the like; and $D$ is a coupling component which is free from solubilizing sulfonic acid and carboxylic acid groups.

22 Claims, No Drawings

PYRROLIDONYLPHENYL AZO DYESTUFFS

The present invention relates to novel dyes for the dyeing of hydrophobic fibers and more particularly to novel dyes from aminophenyl cyclic amide diazo bases, particularly aminophenylpyrrolidone bases, especially useful for dyeing fibers of the types such as polyester fibers and polyacrylonitrile fibers, etc.

It is well known that various hydrophobic fibers are difficultly dyed, particularly by azo dyes. It has not been possible to efficiently dye such hydrophobic fibers with conventional diazo dyes because of the poor adhesion and the retention of the dye by the fiber or fabric.

While various additive materials have been proposed for both the fiber itself and the conventional dyestuff to promote adhesion and retention of the dye, such additive materials have not been sufficiently effective since there is a tendency to inhibit the advantageous properties of the fibers and dyes into which the additives are incorporated.

Until the present invention, therefore, it has not been possible to produce an extremely color-fast dye for hydrophobic fibers without the employment of these disadvantagous additives.

It has now been discovered, however, in accordance with the present invention, that certain dyes prepared from aminophenyl cyclic amide diazo bases, particularly aminophenylpyrrolidone diazo bases have excellent properties for dyeing fibers and fabrics, particularly, hydrophobic fibers.

It is therefore a principal object of the present invention to provide a novel class of dyes for the dyeing of hydrophobic fibers.

It is yet a further object of the present invention to provide certain dyes from aminophenylcyclicamide diazo bases which dyes are particularly effective for dyeing hydrophobic fibers.

Still further objects and advantages of the dyes of the present invention will become more apparent from the following more detailed description of the present invention.

The novel dyes of the present invention are from aminophenyl cyclic amide diazo bases. These dyes have the general formula:

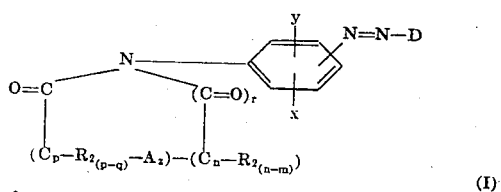

(I)

wherein the $R$'s are independently selected from hydrogen, halogen, hydroxy, alkyl, substituted alkyl (e.g. chloroalkyl, bromoalkyl, hydroxyalkyl, alkoxyalkyl, cyanoalkyl, carbalkoxyalkyl, and the like), aryl, substituted aryl (e.g. phenyl, tolyl, xylyl, alkoxyphenyl, chlorophenyl, carbalkoxyphenyl, sulfamidophenyl, carboxamidophenyl, alkylsulfonylphenyl, alkylaminophenyl, and the like), cycloalkyl and the like;

$A$ is selected from oxygen, nitrogen or sulfur;

$n$ and $p$ are integers having values from 0 to 15;

$n + p$ has a value of at least 2;

$z$ is an integer having a value of 0 or 1;

$r$ is an integer having a value of 0 or 1;

$n + p + z + r$ has a value of at least 3;

$m$ and $q$ are the number of double bonds in the $C_n$ and $C_p$ moieties;

in the case where $r$ is 1, $z$ is 0, and $n$ and $p$ are each 1, one $R$ of each carbon atom may jointly form a six-membered aryl ring;

$x$ and $y$ may each be selected from hydrogen, halogen (e.g. chlorine, bromine), lower alkyl (e.g. methyl, ethyl, propyl), lower alkoxy (e.g. methoxy, ethoxy, propoxy), sulfonic acid amide and substituted sulfonic acid amide (e.g. mono-and di-methyl, -ethyl, -propyl, -butyl, -hydroxyethyl, morpholino, piperidono), carboxylic acid amide and substituted carboxylic acid amide (e.g. mono-and di-methyl, -ethyl, -propyl, -butyl, hydroxy ethyl, morpholino, piperidono), lower alkylsulfonyl (e.g. methyl, ethyl, propyl, butyl), cyano, carbalkoxy, nitro, and the like, and $D$ is a coupling component which is free from solubilizing sulfonic acid and carboxylic acid groups.

Quaternary derivatives of the above defined dyes are also encompassed within the scope of the present invention.

Alternatively, the novel dyestuffs of the present invention can be represented by the following formula:

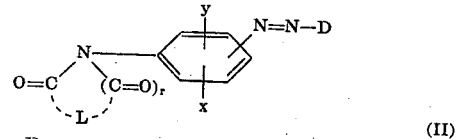

(II)

wherein $y$, $x$, $D$, and $r$ are as defined above in Formula I. The radical

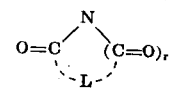

represents the nucleus of a cyclic amide, preferably a five- or six-membered cyclic amide or lactam; $L$ represents an organic radical containing from zero to one hetero atoms selected from oxygen, sulfur and nitrogen and being selected from substituted or unsubstituted, saturated and unsaturated radicals. The radical $L$ can be substituted by the groups represented by $R$ in Formula I above and may contain unsaturation as represented by $m$ and $q$ in formula I.

Additionally, the above dyes can be in the form of their quaternary salt.

The diazo bases may be prepared in any conventional and convenient manner. It has been found that a convenient method to prepare the 1-(m-aminophenyl)-2-lactams is by autoclaving the appropriate m-phenylenediamine with an approximately equivalent amount of the desired lactone. The temperature, pressure and time of the autoclaving can vary considerably, a temperature of about 200°–400° C., a pressure of 150–400 lbs. pressure, and a time from about 5 to 10 hours being preferred.

It has been found that an effective way to prepare the 1-(p-aminophenyl)-2-lactams is by autoclaving the appropriate aniline derivative with an approximately equivalent amount of the corresponding lactone, then nitrating in usual manner and reducing. Here again, the temperature, pressure and time of autoclaving can vary considerably, a temperature of about 200°–400° C., a pressure of 150–400 lbs., and a time from about 5–10 hours being preferred. Conversely, they may also be prepared by reacting the lactone with an equivalent amount of a p-phenylenediamine, or reacting the lactone with an equivalent amount of p-nitroaniline and reducing in the conventional manner.

The following materials exemplify the m-phenylenediamine compounds which may be employed in the production of the novel diazo base dyes of the present invention.

m-phenylenediamine
4-chloro-m-phenylenediamine
5-chloro-m-phenylenediamine
2,5-dichloro-m-phenylenediamine
4,6-dichloro-m-phenylenediamine
4-bromo-m-phenylenediamine
5-methyl-m-phenylenediamine
4-ethyl-m-phenylenediamine
4,5-dimethyl-m-phenylenediamine
4-chloro-5-methyl-m-phenylenediamine
5-methoxy-m-phenylenediamine
5-ethoxy-m-phenylenediamine
3,5-diaminobenzoic acid ethyl ester
3,5-diaminobenzamide
3,5-diamino-N-methylbenzamide
3,5-diamino-N,N-dimethylbenzamide
3,5-diaminobenzoic acid morpholide
2-chloro-3,5-diaminobenzamide
3,5-diaminobenzonitrile 3,5-diaminobenzenesulfonamide
2-chloro-3,5-diaminobenzenesulfonamide
4-chloro-3,5-diaminobenzenesulfonamide
4-bromo-3,5-diaminobenzenesulfonamide
2,4-dichloro-3,5-diaminobenzenesulfonic N,N-diethylamide
4-methylsulfonyl-m-phenylenediamine
4-phenylsulfonyl-m-phenylenediamine The following materials exemplify the aniline compounds which may be employed:
aniline
m- and p-chloroaniline
m- and p-bromoaniline
2,5- and 2,6-dichloroaniline
o- and m- and p-anisidine
o- and m- and p-phenetidine
5-chloro-o-anisidine
o- and m- and p-toluidine
5-chloro-o-anisidine
o- and m- and p-toluidine
5-chloro-o-toluidine
6-chloro-o-toluidine
o-aminobenzoic acid methyl ester
o-aminobenzamide
o-amino-N-methylbenzamide
o-amino-N,N-dimethylbenzamide
o-amino-N,N-diethylbenzamide
o-aminobenzonitrile
orthanilic acid amide
orthanilic acid dimethylamide
orthanilic acid morpholide
orthanilic acid piperidide
o-methylsulfonylaniline
o-ethylsulfonylaniline
o-phenylsulfonylaniline
m-methylsulfonylaniline
p-nitroaniline Specific lactams which may be used as reactants for producing the lactam substituent include:
2-pyrrolidone and the following substituted 2-pyrrolidones
  3-methyl
  4-methyl
  5-methyl
  3-ethyl
  4-ethyl
  5-ethyl
  3,3-dimethyl
  4,4-dimethyl
  5,5-dimethyl
  3,3,5-trimethyl
  3,5,5-trimethyl
  4,5,5-trimethyl
2-imidazolidinone and the following substituted derivatives:
  1-acetyl-5-hexyl
  1-acetyl-5-phenyl
  1-benzoyl-5-cyclohexyl
  1-benzoyl-5-methyl
  4-benzyl-5-methyl
  1-cyclohexyl
  4-cyclohexyl
  4-methyl
  1-dodecyl
  1-isopropyl-4-methyl
  1-methyl-4-phenyl
  5-methyl
  5-ethyl
  5-phenyl
  5-propyl
  5-butyl
  4,5-diethyl
3-morpholinone and derivatives, e.g.
  2-methyl
  2-phenyl
  2-butyl
  2,2-dimethyl
  5-methyl
2-piperidone and derivatives, e.g.
  3-methyl
  4-methyl
  5-methyl
  6-methyl
  3-ethyl
  4-ethyl
  5,5-diethyl
  5,6-dimethyl
  5-ethyl-6-methyl
  6-ethly3-methyl
2-caprolactam and derivatives, e.g.
  3-ethyl
  5-ethyl
  6-ethyl
  7-ethyl
  3-methyl
  4-methyl
  5-methyl
  6-methyl
  3,6-dimethyl
  4,6-dimethyl
  4,7-dimethyl
  7,7-diethyl
  4-ethyl-6-methyl
2-oxazolidinone and derivatives, e.g.
  5-(2,5-diethoxyphenyl)
  5,5-dimethyl
  5,5-diethyl
  5,5-di-n-propyl
  4,4-dimethyl
  4,5-dimethyl-5-phenyl
  4,5-diethyl
  4,5-diphenyl
  5,5-diphenyl
  4-ethyl
  5-ethyl-4-methyl
  5-ethyl-5-phenyl
  5-isobutyl-5-methyl
  4-(methoxymethyl)-5-phenyl
  5-methyl
  5-butyl
  5-n-propyl
  5-isopropyl
  5-methyl-4-phenyl
  4-methyl-5-phenyl
  4,5-dimethyl-5-propyl
  4-phenyl
  5-phenyl
  4,5,5-triphenyl
2-oxazinidinone (2-pentoxazolidone) and derivatives, e.g.
  4-methyl
  6-methyl
  4-ethyl
  6-isopropyl
hexahydropyrimidone and derivatives, e.g.
  5-hydroxy
  4-methyl
  4-ethyl
  4-propyl
  1-phenyl
  4,4,6-trimethyl
  1,4,6-trimethyl
4-oxazolidinone and derivatives, e.g.
  2,2-diethyl-5,6-dimethyl
  2,5-diphenyl
  2,2,5,5-tetraethyl
  2,2,5,5-tetramethyl
  2-acetyl-2,5,5-trimethyl
2-pyridone
2-pyrrolone
4-thiazoline-2-one
2-thiazolindinone
5-methyl-2-thiazolidinone 4-methyl-2-thiazolidinone
4,5-dimethyl-2-thiazolidone
4-thiazolidinone
5-butyl-4-thiazolidinone
2-(p-chlorophenyl)-5-ethyl-4-thiazolidinone
2,2-diphenyl-4-thiazolidinone
succinimide and the following derivatives, e.g.
- 3-benzyl-2-hydroxy-2-phenethyl
- 2-(o-carboxyphenylthio)
- 2-(o-chlorophenyl)
- 2-cyclohexenyl
- 2,2-diethyl-3-methyl
- 2,2-dimethyl
- 2,3-dimethyl-2-phenyl
- 2,3-diphenyl
- 2,2-diphenyl-3-propyl
- 2-dodecyl-3-methyl
- 2-ethyl-3-phenyl
- 3-methyl
- 2-methyl-2-phenyl glutarimide and the following derivatives, e.g.
- 2-benzyl-2-phenyl
- 3-bromo-2,2-diethyl
- 3-bromo-2,2-dimethyl
- 3-bromo-2,2-diphenyl
- 2(p-chlorophenyl)-2-ethyl
- 2(p-chlorophenyl)-2-phenyl
- 2-cyano
- 2-cyano-3,3-dimethyl
- 2-cyano-2-methyl
- 2-cyclohexyl-2-phenyl
- 2,2-diphenyl
- 2-ethyl-3-methyl
- 3-ethyl-3-methyl
- 2-ethyl-2-phenyl diglycolylimide
2-oxo-octamethyleneimine
adipimide
2-ethyl-2-phenyl adipimide
2,2-diphenyl adipimide
   phthalimide Specific lactones which may be used as reactants for producing the lactam substituent include:
butyrolactone and the following substituted butyrolactone
- 3-methyl
- 4-methyl
- 5-methyl
- 3-ethyl
- 4-ethyl
- 5-ethyl
- 3,3-dimethyl
- 4,4-dimethyl
- 5,5-dimethyl valerolactone and the following substituted valerolactones
- 3-methyl
- 4-methyl
- 5-methyl
- 6-methyl γ-valerolactone
γ-chloro-γ-methylbutyrolactone
γ-chloromethylbutyrolactone
α-bromo-γ-chloromethylbutyrolactone
δ-caprolactone
γ-caprolactone
3-ethylbutyrolactone
5,5-dimethylbutyrolactone
4,5-dimethylbutyrolactone
4-bromo-3,3-dimethylbutyrolactone
5-ethyl-5-methylbutyrolactone
3,3,4-trimethylbutyrolactone
5-amylbutyrolactone Any coupling components may be used which do not contain solubilizing carboxylic acid or sulfonic acid groups. Such coupling components couple due to the presence of phenolic OH groups, amino groups and enolizable ketone groups.

Exemplary couplers are illustrated by the following materials:
phenol and substituted phenols such as
- o-, m- and p-chlorophenol
- 2,5-dichlorophenol
- o-, m- and p-bromophenol
- resorcinol
- resorcinol mono methyl ether
- m-nitrophenol
- o-, m- and p-cresol
- 6-chloro-2-hydroxytoluene
- α-chloro-2-hydroxytoluene
- 1-naphthol
- 2-naphthol aniline
- o-, m- and p-chloroaniline
- o-, m- and p-bromoaniline
- 2,5-dichloroaniline;

aniline which is substituted in the amine group by one or two of the following groups
- methyl
- ethyl
- propyl
- butyl
- octyl
- decyl
- lauryl
- octadecyl
- chloroethyl
- bromoethyl
- hydroxyethyl
- hydroxypropyl
- dihydroxypropyl
- epoxypropyl
- cyanoethyl
- acetyl
- chloroacetyl
- benzoyl
- toluoyl
- carbamyl
- carbalkoxyethyl
- dialkylaminoethyl
- morpholinoethyl
- pyridinoethyl
- acetoxyethyl
- acetoxypropyl
- 3-chloro-2-hydroxypropyl;

aniline which is substituted in the 3-position by an amine substituent such as
- acetylamido
- chloroacetylamido
- propionylamido
- benzoylamido
- o-,m- and p-chlorobenzoylamido
- toluoylamido;

and compounds wherein the aniline amine is substituted by the above listed N-substituents for aniline and wherein the three-position is substituted as shown above and wherein other substituents may be present in the ring, particularly in the six-position such as
- halo (chloro, bromo)
- alkoxy (methoxy, ethoxy, propoxy)
- alkyl (methyl, ethyl)

1-naphthylamine
2-naphthylamine
3-hydroxydibenzofurane
8-amino-5-(phenylazo)-2-naphthol
5-amino-8-(5-chloro-o-anisylazo)-naphthol
4-(5-chloro-2-hydroxyphenylazo) resorcinol
8-amino-5-(2-nitrophenylazo)-2-naphthol
4-(5-chloro-2-hydroxyphenylazo) resorcinol, copper salt;

The 3-hydroxy-2-naphtharylide type compounds exemplified by:
- 3-hydroxy-2-naphthanilide
- 3-hydroxy-2-naphth-o-toluidide 3-hydroxy-2-naphth-o-anisidide
3-hydroxy-2-naphth-o-phenetidide
3-hydroxy-3'-nitro-2-naphthanilide
3-hydroxy-5'-chloro-2-naphth-o-toluidide
3-hydroxy-5'-methyl-2-naphth-o-anisidide
3-hydroxy-4'-chloro-2',5'-dimethoxy-2-naphthanilide
3-hydroxy-3'-cyano-2-naphthanilide
3-hydroxy-2-anthra-o-toluidide
2-hydroxy-5'-methyl-3-dibenzofuranecarbox-o-anisidide
2-hydroxy-3'-chloro-3-carbazolecarboxanilide
3-hydroxy-5,6,7,8-tetrahydro-N-(2-naphthyl)-3-naphthamide 2-pyrazolin-5-ones such as
  2-pyrazolin-5-one
  1-phenyl-3-methyl-2-pyrazolin-5-one
  1-(2-chlorophenyl)-3-methyl-2-pyrazolin-5-one
  1-(2,5-dichlorophenyl)-3-methyl-2-pyrazolin-5-one
  1-(3-sulfamidophenyl)-3-methyl-2-pyrazolin-5-one
  1-(3-cyanophenyl)-3-methyl-2-pyrazolin-5-one
  1-(3-dimethylsulfamido)-phenyl-3-methyl-2-pyrazolin-5-one
  1-(1-naphthyl)-3-methyl-2-pyrazolin5-one
  1(o-tolyl)-3-methyl-2-pyrazoline-5-one
  1-(m-anisyl)-3-methyl-2-pyrazolin-5-one
  1-(5-methyl-o-anisyl)-3-methyl-2-pyrazoline-5-one
  1-phenyl-3-carbomethoxy-2-pyrazolin-5-one
  1-(m-anisyl)-3-carboethoxy-2-pyrazolin-5-one
  1-phenyl-3-carboxamido-2-pyrazolin-5-one; and Compounds having enolizable ketone groups such as
  acetoacetanilide
  bis(acetoacet) benzidide
  4'-chloro-2',5'-dimethoxyacetoacetanilide
  bis(acetoacet)-o-tolidide
  teterphthaloyl-bis-[5'-chloro-2'4'-dimethoxy-acetanilide]
  2-(acetoacetamido)-6-ethoxybenzothiazole
  acetoacet-1-naphthanilide It is also to be understood that certain of these compounds containing quaternizable moieties may likewise be quaternized, as for example, by treating in known manner with dimethylsulfate and other known quaternizing agents, e.g. pyridine, to produce the quaternary derivative of the diazo dye.

Also included within the scope of the present invention are the diazo salts from which the novel diazo base dyes of the present invention are obtained. Such diazo salts correspond to the formula:

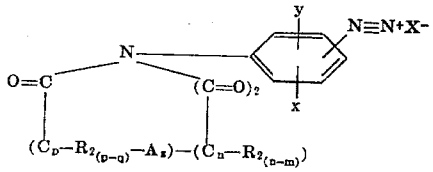

or alternatively

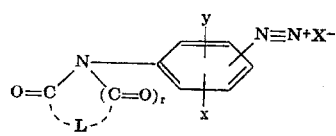

wherein $R$, $A$, $n$, $p$, $z$, $r$, $m$, $q$, $x$, $y$, and $L$ have the values set forth above with respect to formulas I and II and X is a conventional salt forming anion, e.g. chloride, iodide, sulfate, sulfonate, phosphate, etc.

The following examples illustrate certain embodiments of the present invention. It is to be understood that such examples are for purposes of illustration only and the present invention is in no way to be deemed as limited thereto.

EXAMPLE 1

Some 80 g. N-phenyl-2-pyrrolidinone were dissolved in 125 ml. sulfuric acid (66° B.). The temperature rose to 66° C. The viscous solution was cooled in an ice-salt bath to 0°–5° C. Then 76 g. of mixed acid (49% $HNO_3$ – 46% $H_2SO_4$) were added at 0°–5° C. over a 3 hour interval. The solution was stirred overnight, allowing it to come to room temperature. It was drowned in 2 l. water, cooled in an ice bath, filtered at 10°–15 C., washed with 500 ml. ice water and dried. A 95 percent yield of a product was obtained having a m.p. 126°–128° C.

To 500 ml. water were added 100 g. iron filings, 5 ml. formic acid (90 percent) and 1 ml. HCl. The slurry product was heated to 80° C., and then 48 g. N-(p-nitrophenyl)-2-pyrrolidinone were added gradually. The slurry was stirred one hour until the temperature dropped to 50° C. Then 30 g. sodium bicarbonate and 5 ml. ammonium hydroxide were added to give Brilliant Yellow alkalinity. The slurry was suction filtered and the filtrate treated with a pinch of sodium hydrosulfite to prevent air oxidation. The filter cake was washed with 600 ml. boiling water. The volume of filtrate was reduced by distillation to about 300 ml. and cooled. The white precipitate was filtered to yield a product in 75 percent yield having a m.p. 131°–132°C.

Some 17.6 g. of this product was added to 300 cc of water and 22 ml. of concentrated hydrochloric acid (36.5% HCl) and diazotized below 5° C. by adding 18 cc sodium nitrite solution (31.5 percent).

Then 10.8 g. p-cresol was dissolved in 200 cc water and 12 ml.sodium hydroxide (30 percent by weight). The diazo solution was added to the coupler solution slowly, at a temperature of 0°–5° C., maintaining Brilliant Yellow alkalinity with soda ash. 1 liter of water was added, stirred 2 hours and filtered. The product, a greenish-yellow dye, was obtained in 96 percent yield.

The overall reaction can be exemplified by the following scheme:

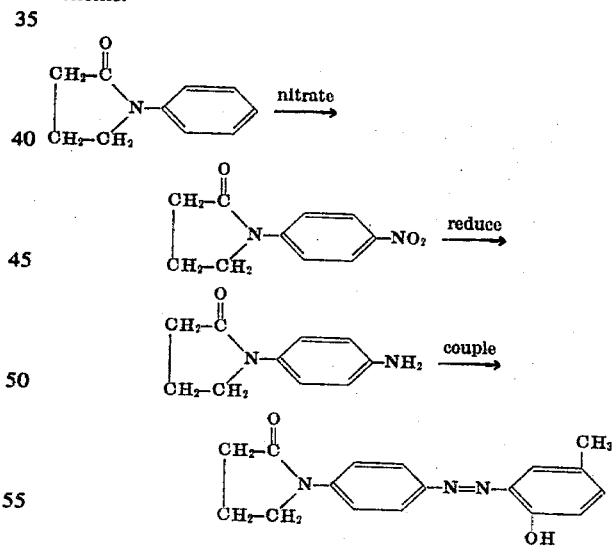

EXAMPLE 2

52.8 g. 1-(p-aminophenyl)-2-pyrrolidinone, was dissolved in 900 milliliters water and 66 ml. hydrochloric acid (20° B.) and diazotized at a temperature below 5° C. by adding 60 g sodium nitrite solution (31.5 percent). After stirring 2 hours at 5°–10° C. the mixture was clarified by filtering it through activated carbon and supercel.

To 400 ml. water were added 24.3 g. 1-(2,5-dichlorophenyl)-3-methyl-2-pyrazolin-5-one and 19 g. soda ash. Then 0.1 mole of the diazo component was added slowly over a 1 hour period to the coupler in an ice bath, maintaining Brilliant Yellow alkalinity. It was then stirred at room temperature for 2 hours, filtered, resludged, and washed with water until neutral. A yellow-orange dye was obtained in 81 percent yield. The product had the formula:

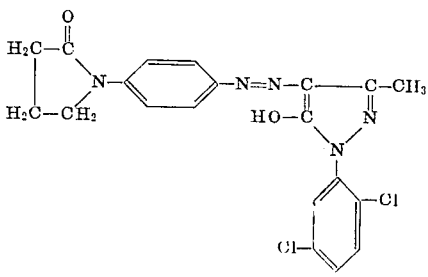

EXAMPLE 3

Some 1,125 g. m-phenylenediamine and 798 ml. butyrolactone were charged into an autoclave and heated at about 220° C. for about 6 hours. A pressure of about 220 lbs. was obtained. The material was drowned in 6 liters water and 450 ml. hydrochloric acid, (20° B.). The fine filtrate produced was filtered and dried yielding the bis product having a m.p. 171° C., 14 percent yield. The filtrate was made slightly alkaline with sodium hydroxide and soda ash, filtered and dried to yield a yellow product having a m.p. of 105° C., 48 percent yield. This was the desired 1-(m-amino)phenyl-2-pyrrolidinone.

Some 52.8 g. of the above product were stirred with 900 cc. water and 70 cc. HCl (20° B.) and diazotized below 5° C. with 70 g. NaNO₂ solution (31.5 percent by weight). The clarified diazo was coupled at a pH of 8.5–9 with a solution of 24.3 g. 1-(2,5-dichlorophenyl)-3-methyl-2-pyrazolin-5-one as in Example 2 to yield a yellow dye.

EXAMPLE 4

Some 1,215 ml. p-phenetidine and 798 ml. butyrolactone were autoclaved for 7 hours at a temperature of 280° C., with attaining of a pressure of about 350 lbs. The material was drowned into 8 l. of ice water with 25 ml. hydrochloric acid (20° B.) with stirring. It was stirred 6 hours, filtered and dried to give a product having a m.p. 113°–114° C., 93 percent yield.

Then 200 g. of this product were added slowly at −5° C. to a mixture of 642 ml. sulfuric acid (66° B.) and 36 ml. sulfuric acid (100 percent). To this cold solution was then added dropwise mixed acid which consisted of 132 g. nitric-sulfuric acid (49/46) and 63 g. sulfuric acid (66° B.). The solution was stirred until the temperature began falling, indicating that no further nitration was occuring. It was drowned in 1,500 g. ice and 750 ml. water, filtered, washed with water and dried. Recrystallization from isopropanol yielded a yellow product, m.p. 106° C.

To 1 l. of water were added 200 g. iron filings, 10 ml. formic acid (90 percent) and 2 ml. hydrochloric acid (CP). At a temperature of 80° C. 200 g. of the above product were slowly added. When the temperature dropped to 50° C. it was made Brilliant Yellow alkaline, filtered, and treated with a pinch of sodium hydrosulfite in the filtrate. Crystals formed on standing. It was recrystallized from isopropyl alcohol.

Then 22 g. of the above were diazotized in the usual manner and coupled with 11 g. p-cresol as in Example 1 to give the following dye:

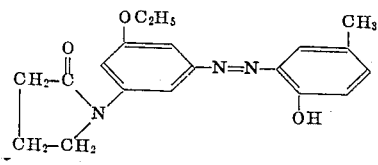

EXAMPLE 5

Some 17.6 g. 1-(p-aminophenyl)-2-pyrrolidinone in 300 ml. water were diazotized employing 18 ml. sodium nitrite solution (31.5 percent sodium nitrite) and 22 ml. hydrochloric acid (CP) at 0°–10° C. A solution was made up of 15.3 g. 2,5-dimethoxyaniline, 200 ml. water and 11 ml. hydrochloric acid (CP). The diazo solution was added to the coupler solution slowly. Concentrated sodium hydroxide solution, 29 ml. was added producing an orange crystalline precipitate. It was cooled, filtered, washed with water and dried. Some 32 g. of the dyestuff were produced in 94 percent yield.

The product had the formula:

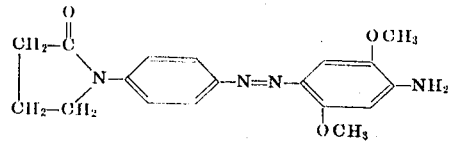

Acetylation of this dye with acetic anhydride in dioxane at 100° C. gave the N-acetyl derivative which is a yellower orange than the unacetylated analogue.

EXAMPLE 6

The diazo of Example 5 was added to a solution of 400 ml. water, 18.8 g. 1-(p-tolyl)-3-methyl-2-pyrazolin-5-one and 19 g. soda ash at 0°–10° C., stirred for 2 hours, filtered, resludged, filtered, washed with water and dried. A yellow dyestuff was obtained in 93 percent yield. The product had the formula:

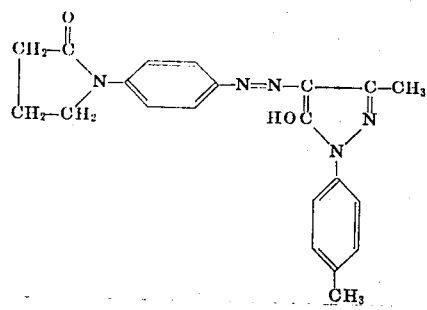

EXAMPLE 7

The diazo of Example 5 was added slowly at 0°–10° C. to a solution of 23.2 g. 1-phenyl-3-carbethoxy-2-pyrazolin-5-one, 400 ml. water and 19 g. soda ash. The composition was stirred 2 hours, filtered, resludged, filtered, washed and dried. A yellow dye was produced in 74 percent yield. It had the formula:

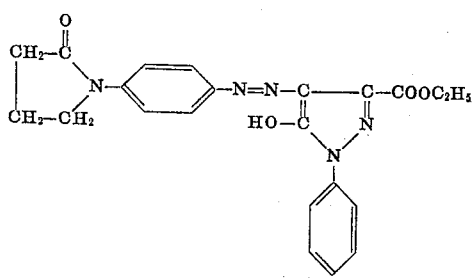

EXAMPLE 8

As in Example 5, the diazo solution of Example 5 at 0°–10° C. was slowly added to a coupler solution which consisted of 13.8 g. resorcinol monoethyl ether and 12 ml. sodium hydroxide (30 percent by wt.) in 600 ml. H₂O, the pH being kept alkaline to phenolphthalein by the addition of 50 g. sodium carbonate. It was stirred overnight, filtered, washed and dried to give a yellow dye in 91 percent yield having the formula:

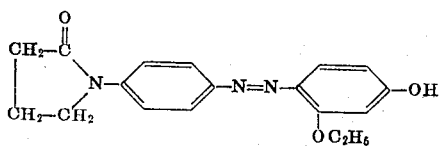

EXAMPLE 9

Some 15 g. p-tert-butylphenol were pasted with 12 ml. sodium hydroxide (30 percent by wt.). 2,600 ml. water and 100 g. sodium carbonate were added. The diazo solution of Example 5 was added dropwise to the coupler at 50° C. The mixture was stirred overnight, filtered, resludged, filtered, washed and dried. The product was a yellow dyestuff, produced in 48 percent yield, having the formula:

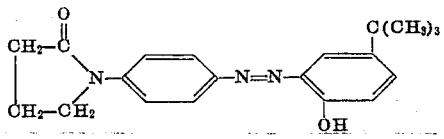

EXAMPLE 10

A coupler solution was prepared which consisted of 360 ml. water, 15 ml. hydrochloric acid (20° B.) and 17 g. N-chloroethyl-N-methyl-aniline. The diazo solution of Example 5 was added slowly while the coupler was in an ice bath. After stirring 2 hours, 300 ml. of soda ash solution 33 percent by weight) were added until a slight turbidity appeared. It was stirred overnight, cooled, and filtered. A yellow dye was obtained in 57 percent yield, having the formula:

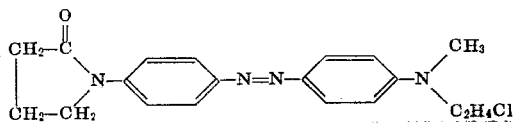

EXAMPLE 11

Some 7.1 g. of the product of Example 10 were mixed with 75 ml. pyridine and refluxed overnight. The product was cooled in ice, the pyridine layer decanted off and the remaining oily layer was treated with 50 ml. petroleum ether. The crystals were filtered, washed with petroleum ether and dried. A water soluble dye was produced which gave a yellow-green solution. The product had the formula:

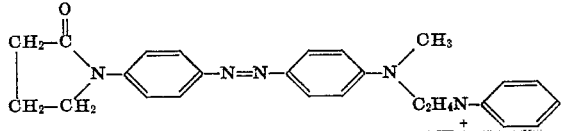

EXAMPLE 12

A coupler solution was prepared consisting of 600 ml. water, 16 ml. hydrochloric acid (20° B.) and 19.8 g. N-chloroethyl-N-ethyl-m-toluidine. The diazo of Example 5 was added slowly while in an ice bath, it was stirred 2 hours, soda ash was added to turbidity (300 ml. 33 percent solution) and stirred overnight, cooled and filtered. The yellow dye was produced in 63 percent yield, having the formula:

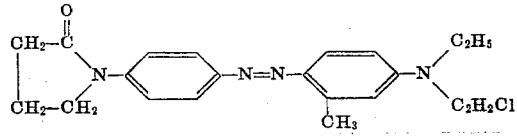

EXAMPLE 13

Some 5.0 g. of the product of Example 12 were refluxed with pyridine overnight, cooled, filtered, and washed with 50 ml. petroleum ether and dried. A 57 percent yield was obtained of needles which dissolved in water to a yellow-orange solution. The product had the formula:

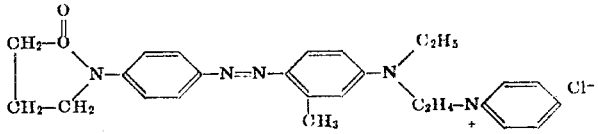

EXAMPLE 14

A solution was prepared consisting of 300 ml. water, 20.9 g. 3-amino-1-(-chlorophenyl)-2-pyrazolin-5-one and 12 ml. sodium hydroxide (30 percent solution). In ice, the diazo of Example 5 was added slowly, phenolphthalein alkalinity being maintained with soda ash. After coupling was complete, the product was cooled, filtered, washed and dried to yield a brownish-yellow dye.

Then 17.4 g. of this product were dissolved in 350 ml. dioxane and heated to reflux. Some 23 ml. acetic anhydride and 5 drops pyridine were added and refluxed 28 hours. The product was drowned in 1,250 ml. ice water. The orange solid was filtered, resludged, filtered, washed and dried. The yield was 64 percent of a red-orange dye having the formula:

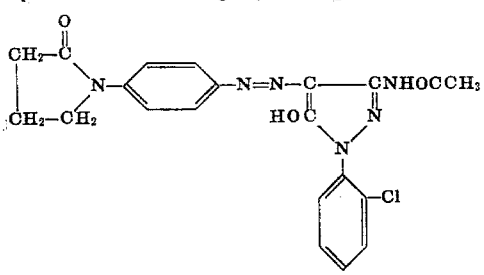

EXAMPLE 15

A solution was prepared consisting of 300 ml. water, 28.1 g. N,N-dimethyl-m-(3-methyl-5-oxo-2-pyrazolin-1-yl) benzenesulfonamide and 12 ml. sodium hydroxide (30 percent by weight). The diazo solution of Example 5 was added slowly to this in an ice bath. Then 18 ml. soda ash solution (100/300 water)were added, stirred 2 hours at room temperature, cooled, filtered and dried. The yield of yellow-orange dye was 79 percent. This dye had the formula:

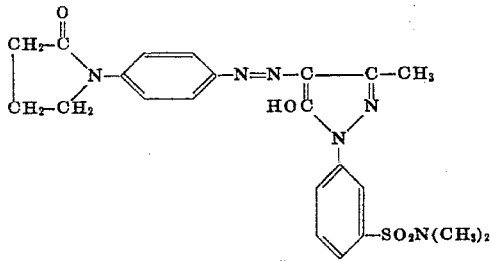

EXAMPLE 16

A solution was prepared consisting of 17.5 g. 1-methyl-2,4(1H,3H)-quinolinedione, 500 ml. water, 44 g. soda ash. The diazo solution of Example 5 was added slowly at 5°–10° C. It was stirred in ice 2 hours, filtered, washed and dried. The product, a bright yellow-orange dye, had the formula:

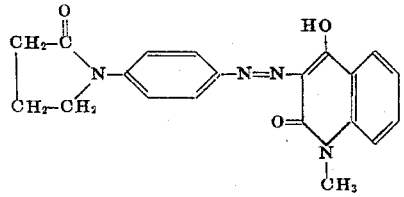

EXAMPLE 17

A solution was prepared consisting of 23.6 g. 1,3-diphenyl-2-pyrazolin-5-one, 500 ml. water and 10 ml. sodium hydroxide solution (30 percent by weight). The diazo solution of Example 5 was added slowly with stirring in ice. The product was maintained at Brilliant Yellow alkalinity. It was stirred in ice, filtered, washed and dried. Some 32.3 g. of product were obtained as orange crystals having the formula:

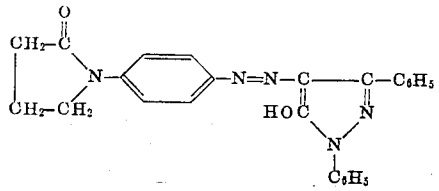

EXAMPLE 18

A solution as prepared consisting of 21.3 g. n-butyl p-hydroxybenzoic acid ester, 500 ml. water and 11 ml. sodium hydroxide (30 percent by weight solution). The diazo solution of Example 5 was added slowly at room temperature maintaining Brilliant Yellow alkalinity. The mixture was stirred 2 hours at room temperature, filtered, washed and dried. Some 33 g. of a greenish-yellow dye were obtained having the formula:

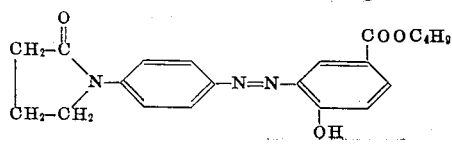

EXAMPLE 19

To 300 cc. of water was added 1 percent dye (o.w.f.) of the dye of Example 13, 0.5 percent Igepal CO-710 and 5 percent ammonium acetate. Ten grams of Acrilan 41 (polyacrylonitrile fiber) were immersed in the bath, heated rapidly to 180° F., and then more slowly to the boil for 1¼ hours. The fabric was rinsed and dried. The fabric was dyed in a bright orange shade having good fastness properties.

EXAMPLE 20

30.4 g. of the dried dye of Example 17 was pasted (160 g. wet paste) and mixed with 6.1 g. Tamol Special (Rohm and Haas) and 3.6 g. Sorbo (70 percent d-sorbitol solution). The pH was brought to 7.8 with 2 drops 10 percent sodium hydroxide solution. 0.8 g. Preventol GDC (2,2'-dihydroxy-5,5'-dichlorodiphenylmethane) were added and the mixture was stirred for 4 hours and then ball milled 3 days.

A dyebath was prepared by initially mixing about 1 cc. of a 10 percent solution of Avitone T (a sodium hydrocarbonsulfonate) with stirring into 100 cc. of water at 54° C. About 20 cc. each of a 10 percent solution of diammonium phosphate and a 10 percent solution of sodium phenylphenolate were introduced with stirring into the resulting solution. A dispersion of about 1 g. of the dispersed dyestuff, pasted in 10 cc. of a 10 percent solution of Avitone T, was then mixed with the phosphate-containing mixture and the resultant mixture diluted with water to 300 cc.

Polyethyleneglycol terephthalate material (Dacron) was immersed in the dyebath which was then heated to the boil. It was dyed one hour, removed, soaped in a boiling 0.1 percent soap solution for about 5 minutes, rinsed and dried. The dyeing was a strong, bright orange color having excellent fastness to sublimation.

EXAMPLE 21

A solution was prepared consisting of 17.1 g. N-ethyl-1-naphthylamine, 20 ml. hydrochloric acid (20° B.) in 2,100 ml. water. The diazo solution of Example 5 was added slowly to the coupler solution with stirring in ice. It was stirred ice-cold 2 hours, filtered, washed and dried. An 81 percent yield of red violet product was obtained of the formula:

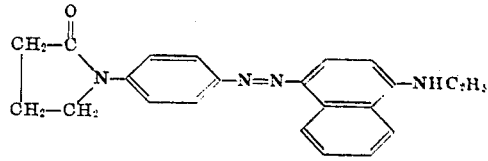

EXAMPLE 22

The diazo of Example 5 was added to a solution of 300 ml. water, 27.2 g. acetoacet-4-chloro-2,5-dimethoxyaniline, and 12 ml. sodium hydroxide (30 percent by weight) with stirring in ice. Brilliant Yellow alkalinity was maintained with soda ash. After stirring 2 hours the product was filtered, washed, and dried to give 83 percent yield of a greenish-yellow dye of the formula:

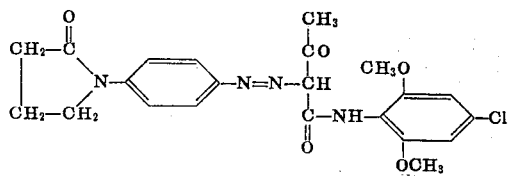

EXAMPLE 23

N-phenylphthalimide was made according to usual proceedure (Ber. 44,3033). This was nitrated and reduced using methods of Example 1 to give N-(p-amino-phenylphthalimide, m.p. 248°–249° C.

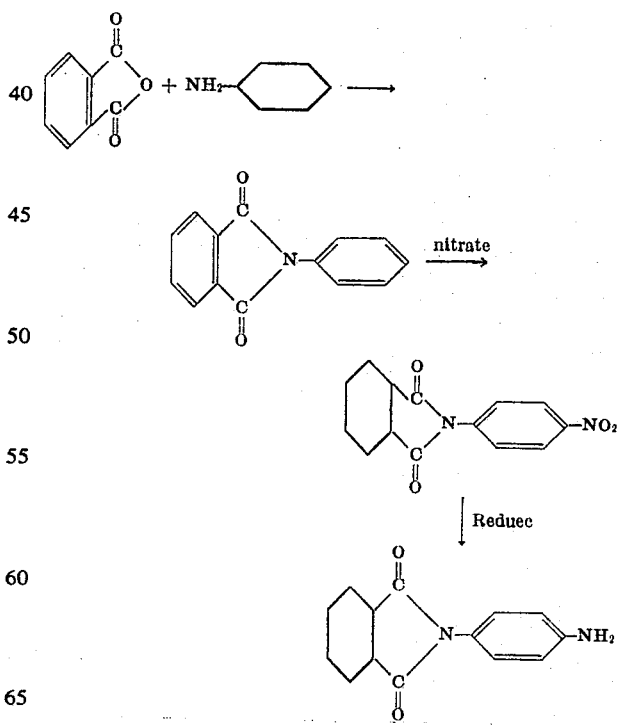

Some 23.8 g. of this product was dissolved in 400 ml. water and 22 ml hydrochloric acid (36.5% HCl) and was then diazotized at a temperature below 5° C. by adding 18 ml. sodium nitrite solution (31.5 percent). This diazo was added dropwise to a solution of coupler of 1-(p-tolyl)-3-methyl-2-pyrazoline-5-one, made up as in Example 6. Alkalinity was maintained Brilliant Yellow with soda ash; stirred 2 hours, filtered, washed and dried to yield a golden yellow dyestuff in 78 percent yield of the formula:

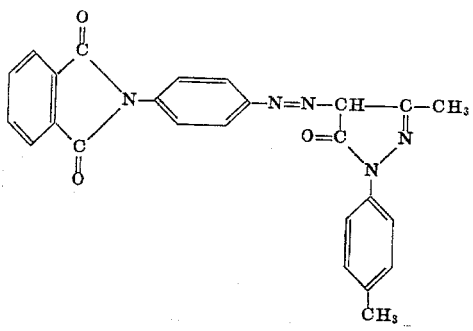

EXAMPLE 24

The diazo solution of Example 5 was added to a solution of 200 ml. of water, 11 ml. of hydrochloric acid (26.5% HCl) and 15.3 g. 2,5-dimethoxyaniline at a temperature below 5° C. The pH was then raised with sodium acetate solution until an orange precipitate was obtained. This was filtered, washed neutral and dried, giving a yield of 94 percent.

30 g. of this compound was dissolved in 300 ml. water and 18 ml. hydrochloric acid (36.5 percent) and heated to 43°–45° C. To this was added 19.7 ml. sodium nitrite solution (31.5 percent). The solution was clarified by treating with Nuchar (activated carbon), filtered and then cooled.

This solution was added to 26 g. N,N-diethyl-3-aminoacetanilide dissolved in 200 ml. water and 9 ml. hydrochloric acid (36.5 percent) with simultaneous addition of 20 percent sodium acetate solution, cooled, filtered and dried. A yield of 70 percent of product was obtained which has the formula:

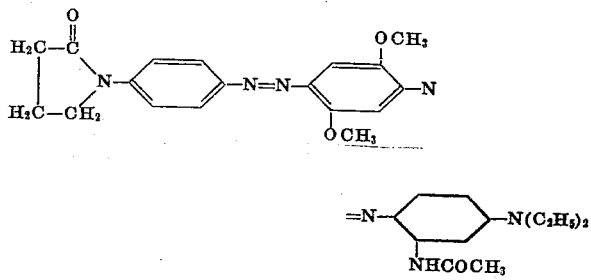

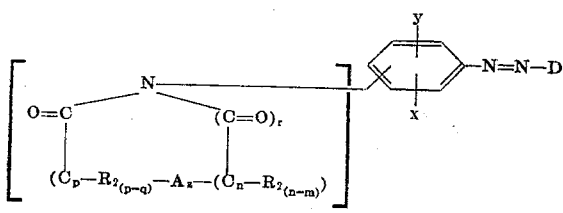

While certain preferred embodiments of the present invention have been illustrated by way of specific example, it is to be understood that the present invention is in no way to be deemed as limited thereto but should be construed as broadly as all or any equivalents thereof.

We claim:

1. An azo dye devoid of metallizable groups ortho to the azo bridge and having the formula:

$$\left[ \begin{array}{c} \text{structure} \end{array} \right]$$

wherein:

The R groups are independently selected from hydrogen; halogen; hydroxy; alkyl containing up to 12 carbon atoms; alkyl containing up to 12 carbon atoms substituted by halo, lower alkoxy, cyano, hydroxy, and carbo-lower alkoxy; phenyl; phenyl substituted by lower alkyl, lower alkoxy, halo, carboloweralkoxy, sulfonamido, carboxamido, loweralkylsulfonyl, and loweralkylamino; and cycloalkyl containing up to six carbon atoms;

$A$ is selected from oxygen, nitrogen and sulfur;

$n$ and $p$ are integers from 0 to 15 and $n$ plus $p$ has a value of at least 2;

$z$ is an integer of 0 or 1;

$r$ is an integer of 0 or 1;

$n + p + z + r$ has a value of at least 3;

$m$ and $q$ are the number of double bonds in the moieties $C_n$ and $C_p$ respectively;

$x$ is selected from hydrogen, halogen, lower alkyl, lower alkoxy, sulfonamido, lower alkylsulfoamido, carboxamido, lower alkylcarboxamido, lower alkylsulfonyl, cyano, and nitro; and $y$ is hydrogen, halogen or methyl; and $D$ is a coupling component free from solubilizing sulfonic acid and carboxylic acid groups, and is selected from the group consisting of phenols, naphthols, aminobenzenes, pyrazolones, lower carboacylacetanilides, and lower carboacylnaphthanilides;

with the provision that when $r$ is 1, $z$ is 0, and $n$ and $p$ are each 1, one $R$ of each carbon atom may jointly form a six-membered aryl ring.

2. The dye according to claim 1 wherein the bracketed moiety represents a pyrrolidonyl moiety.

3. The dye of claim 2 wherein said dye corresponds to the formula:

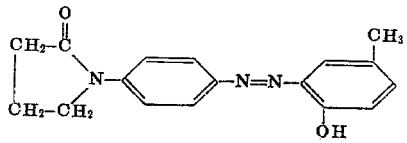

4. The dye of claim 2 wherein said dye corresponds to the formula:

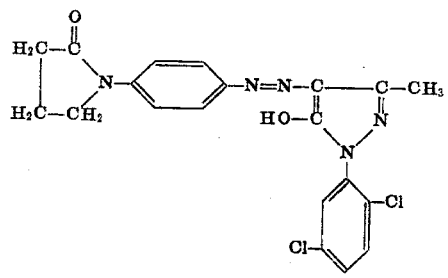

5. The dye of claim 2 wherein said dye corresponds to the formula:

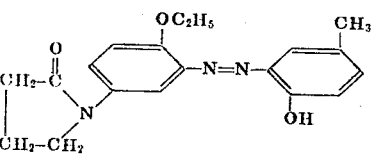

6. The dye of claim 2 wherein said dye corresponds to the formula:

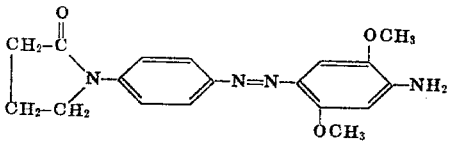

7. The dye of claim 2 wherein said dye corresponds to the formula:

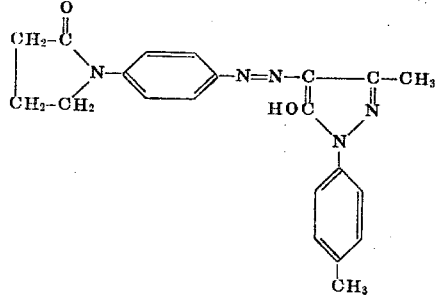

8. The dye of claim 2 wherein said dye corresponds to the formula:

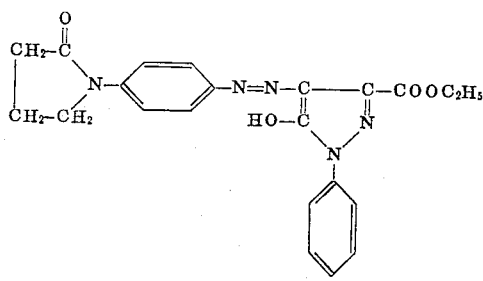

9. The dye of claim 2 wherein said dye corresponds to the formula:

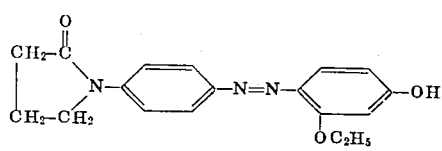

10. The dye of claim 2 wherein said dye corresponds to the formula:

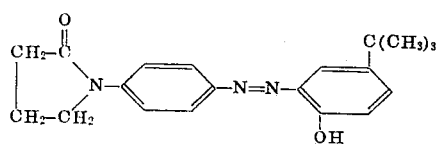

11. The dye of claim 2 wherein said dye corresponds to the formula:

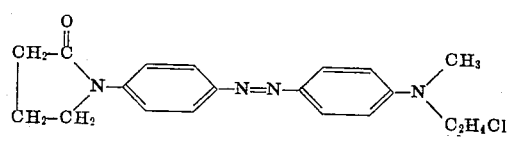

12. The dye of claim 2 wherein said dye corresponds to the formula:

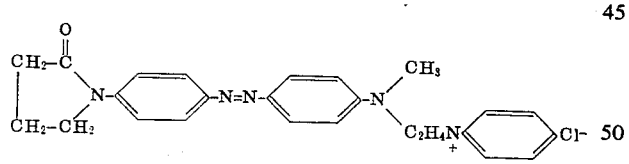

13. The dye of claim 2 wherein said dye corresponds to the formula:

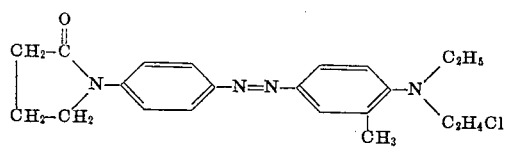

14. The dye of claim 2 wherein said dye corresponds to the formula:

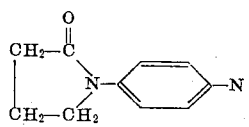

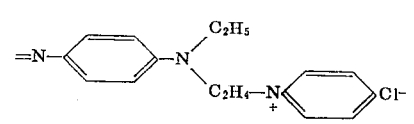

15. The dye of claim 2 wherein said dye corresponds to the formula:

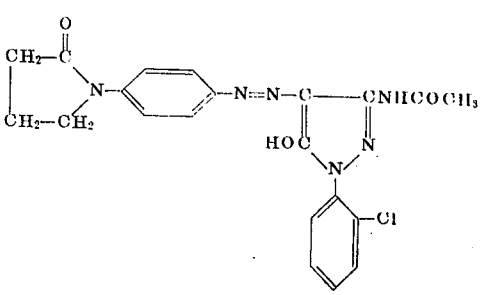

16. The dye of claim 2 wherein said dye corresponds to the formula:

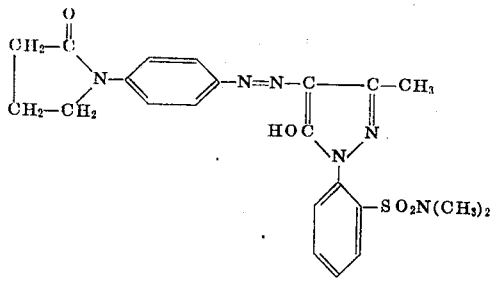

17. The dye of claim 2 wherein said dye corresponds to the formula:

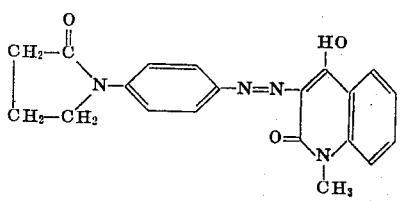

18. The dye of claim 2 wherein said dye corresponds to the formula:

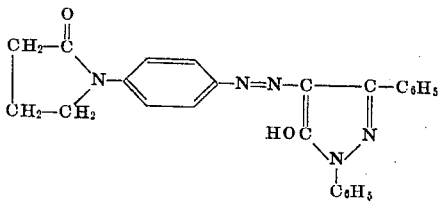

19. The dye of claim 2 wherein said dye corresponds to the formula:

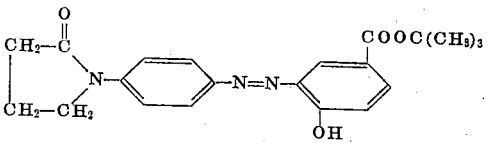

20. The dye of claim 2 wherein said dye corresponds to the formula:

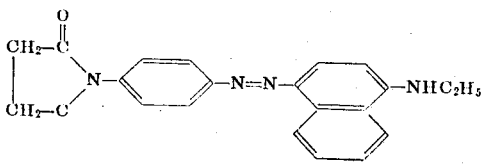

21. The dye of claim 2 wherein said dye corresponds to the formula:
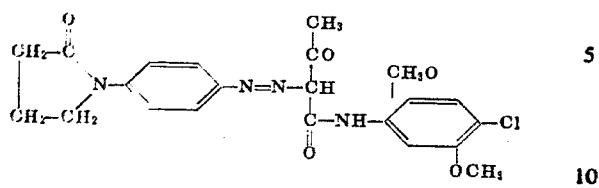
22. The dye of claim 1 wherein said dye corresponds to the formula:
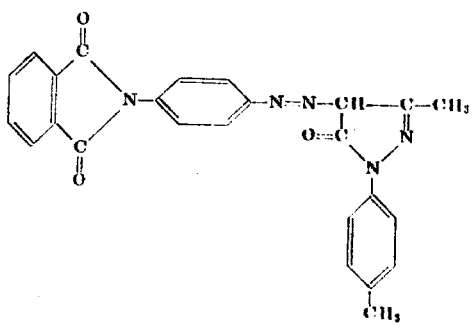
* * * * *